(12) United States Patent
Chino et al.

(10) Patent No.: US 10,601,757 B2
(45) Date of Patent: Mar. 24, 2020

(54) MULTI-OUTPUT MODE COMMUNICATION SUPPORT DEVICE, COMMUNICATION SUPPORT METHOD, AND COMPUTER PROGRAM PRODUCT

(71) Applicant: Kabushiki Kaisha Toshiba, Minato-ku, Tokyo (JP)

(72) Inventors: Tetsuro Chino, Kawasaki Kanagawa (JP); Shoko Miyamori, Kawasaki Kanagawa (JP); Kouji Ueno, Mishima Shizuoka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 161 days.

(21) Appl. No.: 15/246,881

(22) Filed: Aug. 25, 2016

(65) Prior Publication Data

US 2017/0063769 A1 Mar. 2, 2017

(30) Foreign Application Priority Data

Aug. 25, 2015 (JP) ................................. 2015-165815

(51) Int. Cl.
*G06F 15/16* (2006.01)
*H04L 12/58* (2006.01)
(52) U.S. Cl.
CPC .............. *H04L 51/26* (2013.01); *H04L 51/24* (2013.01)
(58) Field of Classification Search
USPC ....................................................... 709/206
See application file for complete search history.

(56) References Cited

U.S. PATENT DOCUMENTS

| 7,013,318 | B2* | 3/2006 | Rosengard | H04L 12/6418 370/395.1 |
| 7,035,923 | B1* | 4/2006 | Yoakum | H04L 67/24 379/106.01 |
| 7,778,518 | B2* | 8/2010 | Kato | G11B 27/034 386/241 |
| 8,504,713 | B2* | 8/2013 | Arya | H04L 65/80 709/231 |
| 8,666,033 | B2 | 3/2014 | Script | |
| 9,203,979 | B1* | 12/2015 | Jaccino | H04M 19/04 |
| 9,367,078 | B2* | 6/2016 | Poornachandran | G06F 1/1688 |

(Continued)

FOREIGN PATENT DOCUMENTS

| JP | H 07-200231 A | 8/1995 |
| JP | H 10-320093 A | 12/1998 |

(Continued)

*Primary Examiner* — Alicia Baturay
(74) *Attorney, Agent, or Firm* — Knobbe, Martens, Olson & Bear, LLP

(57) ABSTRACT

According to an embodiment, a communication support device includes a first acquisition unit, a creation unit, and an output unit. The first acquisition unit acquires a message to be notified to a user. The creation unit creates type information indicating a type of content of the message. The output unit outputs the message in an output mode based on importance of the message among a plurality of output modes including at least a first output mode for outputting an entire message, a second output mode for outputting the type information, and a third output mode for outputting reception information indicating reception of the message.

13 Claims, 10 Drawing Sheets

42

| OUTPUT ID | MESSAGE ID | USER ID (NOTIFIED USER) | STATE INFORMATION | OUTPUT MODE | OUTPUT STATE |
|---|---|---|---|---|---|
| N1b | M1a | B | STATE IN WHICH USER CAN CHECK ENTIRE MESSAGE CONTENT | FIRST OUTPUT MODE | COMPLETED |
| N1c | M1a | C | STATE IN WHICH USER CAN CHECK PART OF MESSAGE CONTENT | SECOND OUTPUT MODE | COMPLETED |
| N2c | M1a | C | STATE IN WHICH USER CAN CHECK ENTIRE MESSAGE CONTENT | FIRST OUTPUT MODE | NOT COMPLETED |
| N1d | M1a | D | STATE IN WHICH USER CANNOT CHECK MESSAGE | THIRD OUTPUT MODE | COMPLETED |
| N2d | M1a | D | STATE IN WHICH USER CAN CHECK PART OF MESSAGE CONTENT | SECOND OUTPUT MODE | COMPLETED |
| N3d | M1a | D | STATE IN WHICH USER CAN CHECK ENTIRE MESSAGE CONTENT | FIRST OUTPUT MODE | NOT COMPLETED |
| N1e | M1a | E | STATE IN WHICH USER DOES NOT NEED TO CHECK MESSAGE | FOURTH OUTPUT MODE | NOT COMPLETED |

(56) References Cited

U.S. PATENT DOCUMENTS

| | | | |
|---|---|---|---|
| 9,380,146 B1* | 6/2016 | Gopalakrishnan | G10L 13/08 |
| 9,616,751 B2* | 4/2017 | Ding | B60K 37/06 |
| 9,854,439 B2* | 12/2017 | Raniere | H04W 12/06 |
| 9,887,949 B2* | 2/2018 | Shepherd | H04L 51/24 |
| 10,115,390 B2* | 10/2018 | Gopalakrishnan | H04M 1/72552 |
| 10,165,105 B1* | 12/2018 | Do | H04M 1/72569 |
| 2001/0008404 A1 | 7/2001 | Naito et al. | |
| 2008/0259962 A1* | 10/2008 | Mori | H04N 21/4305 370/498 |
| 2012/0265575 A1 | 10/2012 | Torii et al. | |
| 2013/0182147 A1 | 7/2013 | Kimoto et al. | |
| 2013/0218553 A1* | 8/2013 | Fujii | G10L 15/26 704/9 |
| 2015/0228281 A1* | 8/2015 | Raniere | G06F 3/167 704/275 |
| 2016/0142495 A1* | 5/2016 | Lin | H04L 51/36 709/204 |
| 2016/0360426 A1* | 12/2016 | Shaw | H04W 4/30 |
| 2019/0014205 A1* | 1/2019 | Miloseski | G06F 3/0482 |

FOREIGN PATENT DOCUMENTS

| | | |
|---|---|---|
| JP | 2000-099441 A | 4/2000 |
| JP | 2009-110038 A | 5/2009 |
| JP | 2013-025554 A | 2/2013 |
| JP | 5166569 B2 | 3/2013 |
| JP | 2013-167806 A | 8/2013 |

* cited by examiner

FIG.3

| MESSAGE ID | MESSAGE | USER ID (ORIGINAT-ING USER) | ACQUISI-TION TIME | TYPE INFORMA-TION | IMPOR-TANCE |
|---|---|---|---|---|---|
| M1a | INSTALLATION WORK OF PART X HAS BEEN STARTED | A | ... | PROGRESS REPORT | MEDIUM |
| M7x | INSTALLATION WORK OF PART IS IN ORDER | X | ... | PROGRESS REPORT | LOW |
| M9x | INSTALLATION OF PART 5 IS INCOMPLETE | Y | ... | INSPECTION REPORT | HIGH |

| OUTPUT ID | MESSAGE ID | USER ID (NOTIFIED USER) | STATE INFORMATION | OUTPUT MODE | OUTPUT STATE |
|---|---|---|---|---|---|
| N1b | M1a | B | STATE IN WHICH USER CAN CHECK ENTIRE MESSAGE CONTENT | FIRST OUTPUT MODE | COMPLETED |
| N1c | M1a | C | STATE IN WHICH USER CAN CHECK PART OF MESSAGE CONTENT | SECOND OUTPUT MODE | COMPLETED |
| N2c | M1a | C | STATE IN WHICH USER CAN CHECK ENTIRE MESSAGE CONTENT | FIRST OUTPUT MODE | NOT COMPLETED |
| N1d | M1a | D | STATE IN WHICH USER CANNOT CHECK MESSAGE | THIRD OUTPUT MODE | COMPLETED |
| N2d | M1a | D | STATE IN WHICH USER CAN CHECK PART OF MESSAGE CONTENT | SECOND OUTPUT MODE | COMPLETED |
| N3d | M1a | D | STATE IN WHICH USER CAN CHECK ENTIRE MESSAGE CONTENT | FIRST OUTPUT MODE | NOT COMPLETED |
| N1e | M1a | E | STATE IN WHICH USER DOES NOT NEED TO CHECK MESSAGE | FOURTH OUTPUT MODE | NOT COMPLETED |

FIG.5A

| USER ID | ATTIRUBTE |
|---|---|
| A | GENERAL USER |
| B | GENERAL USER |
| C | GENERAL USER |
| D | MANAGER |
| E | MANAGER |

| GROUP ID | USER ID |
|---|---|
| 01 | A, B, C, D, E |
| 02 | X, Y, Z |

| KEYWORD | USER ATTRIBUTE | | IMPORTANCE |
| | ORIGINATING USER | NOTIFIED USER | |
|---|---|---|---|
| "EMERGENCY", "URGENT", "INCOMPLETE"... | MANAGER, GENERAL USER | MANAGER, GENERAL USER | HIGH |
| "REPORT", "INSTRUCTION"... | MANAGER | GENERAL USER | HIGH |
| ... | ... | ... | MEDIUM |
| ... | ... | ... | LOW |

MULTI-OUTPUT MODE COMMUNICATION SUPPORT DEVICE, COMMUNICATION SUPPORT METHOD, AND COMPUTER PROGRAM PRODUCT

CROSS-REFERENCE TO RELATED APPLICATIONS

This application is based upon and claims the benefit of priority from Japanese Patent Application No. 2015-165815, filed on Aug. 25, 2015; the entire contents of which are incorporated herein by reference.

FIELD

An embodiment described herein relates generally to a communication support device, a communication support method, and a computer program product.

BACKGROUND

A method of controlling a message output from a system to a user is known. For example, JP-A 10-320093 (KOKAI) discloses a technique that adjusts the timing of message output according to the property of the message and the state of a user. In addition, JP-A 2009-110038 (KOKAI) discloses a technique that presents information to a user when the user is in a state in which the information can be presented, and stands-by for the presentation when the user is in a state in which the information cannot be presented.

BRIEF DESCRIPTION OF THE DRAWINGS

FIG. 3 is a diagram illustrating an exemplary data configuration of message management information;
FIG. 4 is a diagram illustrating an exemplary data configuration of output management information;
FIGS. 5A and 5B are diagrams illustrating exemplary data configurations of user management information and communication target management information, respectively;
FIG. 6 is a diagram illustrating an exemplary data configuration of analysis information.

DETAILED DESCRIPTION

According to an embodiment, a communication support device includes a first acquisition unit, a creation unit, and an output unit. The first acquisition unit acquires a message to be notified to a user. The creation unit creates type information indicating a type of content of the message. The output unit outputs the message in an output mode based on importance of the message among a plurality of output modes including at least a first output mode for outputting an entire message, a second output mode for outputting the type information, and a third output mode for outputting reception information indicating reception of the message.

A communication support device, a communication support method, and a computer program will now be explained in detail with reference to the appended drawings.

A communication support system according to an embodiment provides a message to a user. The provision of a message includes providing a message received from one user to another user, and providing a message received from one user to the user. The communication support system according to the present embodiment is applicable to situations where a physical action or an operation of an apparatus or the like is needed. For example, the communication support system can be introduced to a production site, a medical site, care giving site, a machine maintenance site, a sales site, and any other site.

Figure 1:
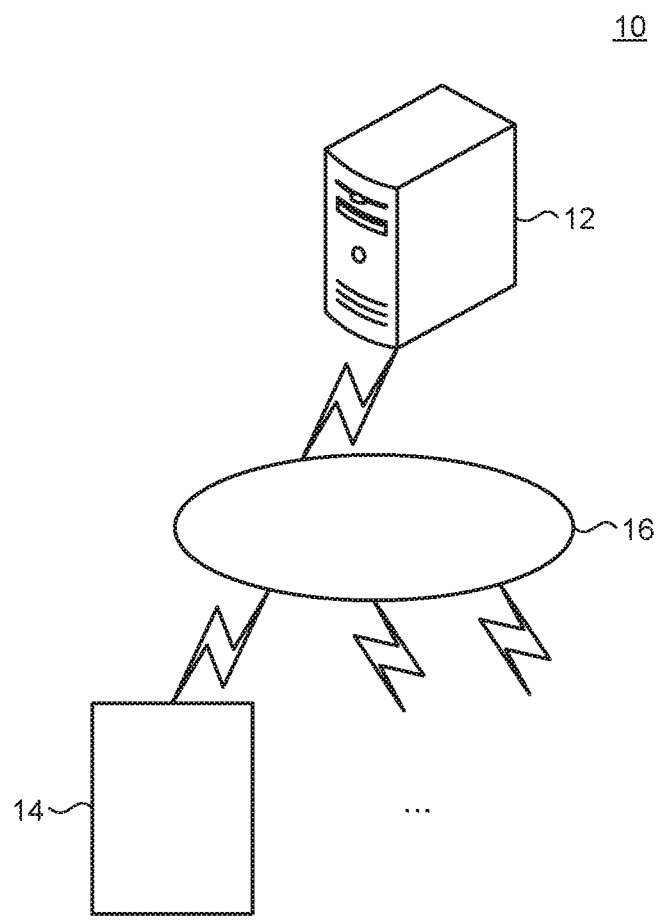
FIG. 1 is a schematic diagram illustrating a communication support system according to an embodiment.

FIG. 1 is a schematic diagram illustrating a communication support system 10 according to the present embodiment.

The communication support system 10 includes a communication support device 12 and a terminal device 14. The communication support device 12 and the terminal device 14 are connected to each other over a network 16. The network 16 is a known communication network. An example of the network 16 includes the Internet. The network 16 may be implemented by, for example, a cable, a transceiver, a router, a switch, a wireless local access network (LAN) access point, a wireless LAN transmitter receiver, and other devices.

In the following description, the communication support device 12 is referred to as a support device 12. The support device 12 is a device for managing the communication support system 10. The support device 12 can be a personal computer (PC). The support device 12 stores therein a message acquired from the terminal device 14. The support device 12 also notifies the terminal device 14 and another terminal device 14 of the message.

The terminal device 14 is operated by a user who uses the communication support system 10. In the present embodiment, the communication support system 10 includes a plurality of terminal devices 14. The terminal devices 14 are carried by, for example, respective different users. Each of the users checks a message on the terminal device 14 that is carried by the user. Examples of the terminal device 14 include a PC and a mobile terminal. The present embodiment provides exemplary description in which the terminal device 14 is a mobile terminal that is carried by a user.

Figure 2:
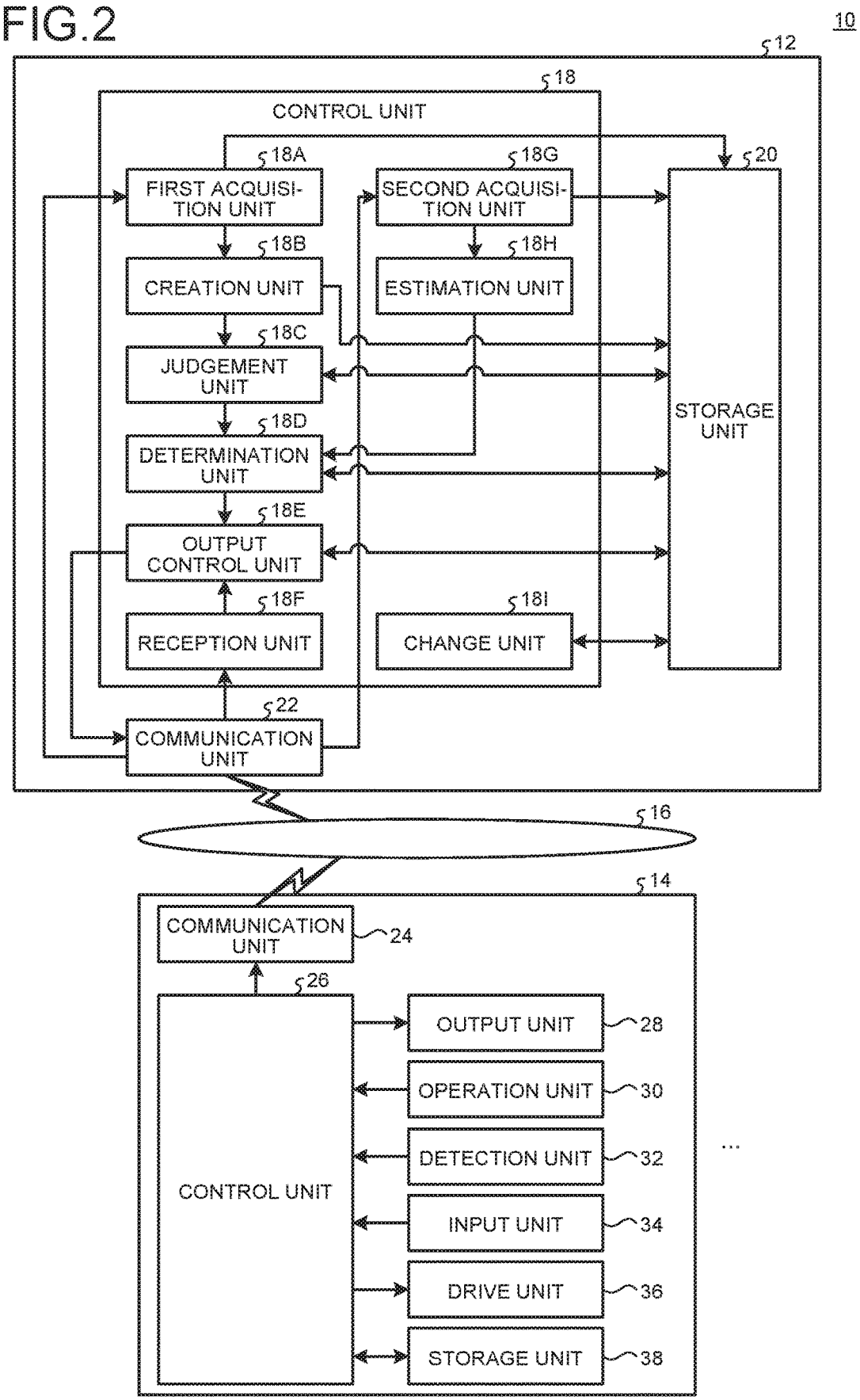
FIG. 2 is a functional block diagram illustrating the communication support system.

FIG. 2 is a functional block diagram illustrating the communication support system 10.

First, the following describes the support device 12. The support device 12 includes a control unit 18, a storage unit 20, and a communication unit 22. The storage unit 20 and the communication unit 22 are connected to the control unit 18 in such a manner that data and signals can be exchanged.

The communication unit 22 communicates with the terminal devices 14, an external device, and other devices over the network 16 in a wireless or wired manner.

The storage unit 20 stores therein various data. The storage unit 20 is a known storage medium such as a hard disk. In the present embodiment, the storage unit 20 stores therein message management information, output management information, user management information, communication target management information, analysis information, and other information.

The message management information is information used for managing a message. FIG. 3 is a diagram illustrating an exemplary data configuration of message management information 40. The message management information 40 is data in which a message ID, a message, a user ID, an acquisition time, type information, and importance are associated with one another. The data format of the message management information 40 is not limited. For example, the message management information 40 includes a database or a table.

The message is data that is received from the terminal device 14. The message is target data to be notified to a user of a transmission source of the message or another user by the user. Examples of the message include voice data and video data. A message processed by the communication support system 10 preferably has reproduction time that is equal to or longer than predetermined time.

The present embodiment provides exemplary description in which a message is voice data.

The message ID is identification information that identifies a corresponding message. User IDs registered in the message management information 40 are identification information of users of transmission sources of respective messages. The acquisition time is a timing at which a corresponding message is acquired by the support device 12. The acquisition time may be any information that indicates the timing. For example, the acquisition time may indicate the timing at which a message is acquired, by year, month, date, hour, minute, and second, or by hour and minute.

The type information is information that indicates the type of content of a corresponding message. The type of content is obtained by classifying message content into a plurality of types. Examples of the type information include progress report and inspection report. The types indicated by the type information, however, are not limited thereto. The type information may be referred to as tag information.

The importance indicates the degree of importance of a corresponding message.

The message management information 40 is updated by processing performed by the control unit 18, which will be described later.

Next, the following describes the output management information. The output management information is information for managing a notification state of a message to the terminal device 14.

FIG. 4 is a diagram illustrating an exemplary data configuration of output management information 42. The output management information 42 is data in which an output ID, a message ID, a user ID, state information, an output mode, and an output state are associated with one another.

The message ID is the same as that in the message management information 40. User IDs registered in the output management information 42 are identification information of users notified of respective messages. The output ID is identification information that is assigned to each combination of a message ID and a user ID.

The state information is information that indicates a state of a user who is identified by a corresponding user ID. A state of a user indicates a degree at which the user, who is to be notified of a message, can check the message content. The degree at which a user can check a message is indicated by a plurality of levels that indicate respective states, for example, from a state in which the user can check the entire content of a notified message, to a state in which the user cannot check a message at all or the user does not need to check a message.

In the present embodiment, the state information indicates one of a "state in which a user can check entire message content", a "state in which a user can check part of message content", a "state in which a user cannot check a message", and a "state in which a user does not need to check a message".

The output mode indicates a mode that is used by the terminal device 14 to output a message. Output includes at least one of voice output and image display. In the present embodiment, a plurality of output modes are used. The output modes each have different reproduction time for outputting a message.

The output mode includes, for example, three output modes: a first output mode, a second output mode, and a third output mode. The output mode may include two or four or more output modes, and not limited to three output modes. The present embodiment provides description in which the output mode further includes a fourth output mode. That is, the present embodiment provides description in which the output modes are four output modes.

The first output mode is a mode for outputting an entire message. Outputting an entire message is to output a message acquired by a first acquisition unit 18A without compression or processing. In other words, outputting an entire message is to output a message acquired by the first acquisition unit 18A, as it is.

The second output mode is a mode for outputting type information that indicates the type of content of a message. The third output mode is a mode for outputting reception information that indicates reception of a message.

Outputting reception information is to output, for example, a sound (reception sound) that indicates reception of a message. The reception information may be a signal corresponding to at least one of the type of the message, the importance of the message, the user of the transmission source of the message, the location of the user of the transmission source of the message, and the type information of the message. For example, the reception information may be reception information that is sound quality (a combination of sound pitch, sound frequency, and sound length) according to a combinations of one or more of the type of the message, the importance of the message, the user of the transmission source of the message, the location of the user of the transmission source of the message, and the type information of the message.

The fourth output mode is a mode for not outputting a message. Thus, in the present embodiment, reproduction time is longest for output in the first output mode, and is shortest for output in the fourth output mode. The reproduction time of a message decreases in the order of the first output mode, the second output mode, the third output mode, and the fourth output mode.

The output state is information that indicates whether the terminal device 14 of a notified user has output a message. The output state defaults to "not completed", and is changed to "completed" by processing performed by the control unit 18, which will be described later.

The output management information 42 is updated by processing performed by the control unit 18, which will be described later.

Next, the following describes the user management information and the communication target management information. The user management information 44 is information for managing a user who uses the communication support system 10. The communication target management information 46 is information obtained by registering user IDs of a plurality of users who communicate with one another by using the communication support system 10, by group in which the users perform communication.

FIGS. 5A and 5B are diagrams illustrating exemplary data configurations of user management information 44 and the communication target management information 46, respectively. FIG. 5A is a diagram illustrating an exemplary data configuration of the user management information 44. The user management information 44 is information in which a user ID and an attribute are associated with each other. The user ID is identification information of a user who uses the communication support system 10, and is the same as the user ID registered in the message management information 40 and the output management information 42 that are described above.

The attribute indicates a property of a user identified by the corresponding user ID. The attribute is information that indicates each group of users obtained by classifying users who use the communication support system 10 into a plurality of groups by a predetermined classification condition. For example, a plurality of users are classified into a group of managers and a group of users other than the managers (general users). In this case, the attribute includes manager and general user. Alternatively, when a plurality of users are classified by location at which work such as a job is performed, the attribute is information that indicates locations at which work is performed (for example, work area A and work area B). Any classification condition may be set, and is not limited to the above classification conditions.

The attribute corresponding to one user ID may include one or more attributes. That is, a plurality of attributes may be associated with the user ID of one user.

FIG. 5B is a diagram illustrating an exemplary data configuration of the communication target management information 46. The communication target management information 46 is information in which a group ID and a user ID are associated with each other. The group ID is identification information of a group to which a user who performs communication belongs. In the example illustrated in FIG. 5B, five users identified by the user IDs "A", "B", "C", "D", and "E" belong to a group identified by a group ID, and perform communication using the communication support system 10.

The user management information 44 and the communication target management information 46 can be modified according to an operation instruction from a user or other actions.

Next, the following describes the analysis information. The analysis information is information that the control unit 18 uses to analyze the importance of a message. FIG. 6 is a diagram illustrating an exemplary data configuration of analysis information 48. In the example illustrated in FIG. 6, the analysis information 48 is information in which a keyword, a user attribute, and importance are associated with one another.

The keyword indicates a word or a character contained in a message and used for judging the importance. The user attribute registered in the analysis information 48 is presented by a combination of an attribute of a user of a transmission source and an attribute of a notified user.

The control unit 18 judges the importance of a message by using the message and the analysis information 48 (the judging will be described later in detail).

Referring back to FIG. 2, the control unit 16 controls the support device 12. The control unit 18 includes the first acquisition unit 18A, a creation unit 18B, a judgment unit 18C, a determination unit 18D, an output control unit 18E, a reception unit 18F, a second acquisition unit 18G, an estimation unit 18H, and a change unit 18I.

Some or all of the first acquisition unit 18A, the creation unit 18B, the judgment unit 18C, the determination unit 18D, the output control unit 18E, the reception unit 18F, the second acquisition unit 18G, the estimation unit 18H, and the change unit 18I may be implemented by causing a processor such as a central processing unit (CPU) to execute a computer program, that is, implemented as software, or may be implemented as hardware such as an integrated circuit (IC), or as a combination of software and hardware.

The first acquisition unit 18A acquires a message to be notified to a user. The first acquisition unit 18A acquires the message from the terminal device 14 through the communication unit 22 and the network 16. At this time, the first acquisition unit 18A acquires, from the terminal device 14, the message and the user ID of the user of the transmission source of the message.

The first acquisition unit 18A assigns a message ID to the acquired message. The first acquisition unit 18A then stores the message ID, the acquired message, the user ID of the user of the transmission source of the message, and the acquisition time of the message in the message management information 40 in a manner associated with one another (refer to FIG. 3).

The creation unit 18B creates type information that indicates the type of content of the message acquired by the first acquisition unit 18A. For example, the creation unit 18B uses a known data analysis method to extract a keyword contained in the message. The creation unit 18B then creates type information that corresponds to the extracted keyword and indicates the type of content of the message.

For example, the storage unit 20 stores therein the keyword contained in the message and the type information in a manner associated with each other. The creation unit 18B may then create type information by reading, from the storage unit 20, type information corresponding to a keyword contained in a message.

The data amount of type information is preferably smaller than the data amount of the message used for creating the type information. Specifically, reproduction time for type information is preferably shorter than reproduction time for the message used for creating the type information. The type information may be information that indicates a word describing a type of content of a message, or may be a figure or a symbol that illustrates the type of content.

The creation unit 18B stores the created type information in the message management information 40 in a manner associated with the message used for creating the type information (refer to FIG. 3).

The judgment unit 18C judges the importance of a message acquired by the first acquisition unit 18A. The judgment unit 18C analyzes a word contained in the message, the type or a word contained in the message, whether the message contains an alarm sound, or other items.

A message is analyzed using a known analysis technique. Examples of a known analysis technique include voice analysis processing and collation processing. Examples of voice analysis processing include voice section detection, power analysis, fast Fourier transform (FFT), and spectral analysis. Collation processing is performed with a voice recognition vocabulary dictionary including an acoustic model, a language model, and other models. Collation processing uses, for example, a hidden Markov model (HMM), a neutral network (NN), dynamic programming (DP), a weighted finite state transducer (WFST), or other techniques.

In addition, examples of a known analysis technique include voice signal detection, voice analysis, voice classification, prosody analysis, and voice recognition techniques.

The judgment unit 180 uses the above known analysis techniques to analyze a word contained in a message or the type of a word contained in a message.

The judgment unit 180 uses the above known analysis techniques also to judge whether a message contains a known signal sound used as a signal indicating importance or emergency. By the judgment, the judgment unit 180 analyzes whether the message contains an alarm sound.

The judgment unit 180 uses the above known analysis techniques to analyze length of voice, volume of voice, sound quality, voice quality, and an utterance method of a voice contained in a message. By the analysis, the judgment unit 180 may analyze whether the message contains an alarm sound.

The judgment unit 180 then judges the importance of the message from the analysis result of the message. For example, the judgment unit 180 judges that a message of higher emergency or higher necessity for a job or work has higher importance on the basis of the analysis result of the message.

For example, the analysis result and the importance of a message are preliminarily stored in the storage unit 20 in a manner associated with each other. The judgment unit 180 may then judge the importance of a message by reading, from the storage unit 20, the importance corresponding to the analysis result.

The judgment unit 180 may judge the importance of a message on the basis of the message and the type information of the message. In this case, the judgment unit 180 judges the emergency of a message or the necessity of a message for a job or work on the basis of the analysis result of the message and a word contained in the type information. The judgment unit 180 then judges that a message of higher emergency or higher necessity for a job or work has higher importance.

For example, the analysis result, a word contained in the type information, and the importance of a message are preliminarily stored in the storage unit 20 in a manner associated with one another. The judgment unit 180 may then judge the importance of a message by reading, from the storage unit 20, the importance corresponding to the analysis result.

The judgment unit 180 may judge the importance on the basis of at least one of the message, the type information of the message, the attribute of a user to be notified of the message, and the attribute of the user of the transmission source of the message.

In this case, the judgment unit 180 judges the emergency of the message or the necessity of the message for a job or work on the basis of the analysis result of the message, a word contained in the type information of the message, the attribute of a user to be notified of the message, and the attribute of the user of the transmission source of the message. The judgment unit 180 then judges that a message or higher emergency or higher necessity for a job or work has higher importance.

For example, the analysis information 48 is preliminarily stored in the storage unit 20 (refer to FIG. 6). The judgment unit 180 then defines, as keywords, a word contained in a message and a word contained in the type information of the message. The judgment unit 180 identifies the user ID of the user of the transmission source of the message acquired by the first acquisition unit 18A. The judgment unit 180 then reads the attribute corresponding to the identified user ID from the user management information 44 (refer to FIG. 5A).

The judgment unit 180 identifies the user notified of the message. For example, the judgment unit 18C identifies the group ID of the group to which the user ID of the user of the transmission source of the message belongs from the communication target management information 46 (refer to FIG. 5B). The judgment unit 18C then reads, as the user ID of the notified user, a user ID other than the user ID of the user of the transmission source among the user IDs corresponding to the identified group ID in the communication target management information 46. The judgment unit 180 may then identify the read user ID to be the user ID of the notified user.

The first acquisition unit 18A may acquire, from the terminal device 14, the message, the user ID of the user of the transmission source of the message, and the user ID of a user notified of the message. In this case, the judgment unit 180 may read the user ID of the notified user acquired together with the message by the first acquisition unit 18A. The judgment unit 180 may then identify the read user ID to be the user ID of the notified user.

The judgment unit 180 then reads the attribute corresponding to the user ID of the user identified to be a notified user from the user management information 44 (refer to FIG. 5A).

In addition, the judgment unit 180 reads, from the analysis information 48, the importance corresponding to the defined keywords, the attribute of the user ID of the user of the transmission source of the message, and the attribute of the user ID of the user notified of the message. In this manner, the judgment unit 18C may judge the importance.

Referring back to FIG. 2, the determination unit 18D determines an output mode among a plurality of output modes on the basis of importance. On the basis of the importance of the message acquired by the first acquisition unit 18A, the determination unit 18D determines an output mode of the message to be used for each of the users notified of the message. In the present embodiment, the determination unit 18D determines an output mode having a longer reproduction time for a message of higher importance.

As described above, an output mode indicates a mode for outputting a message by the terminal device 14. In the present embodiment, the output mode includes the first output mode, the second output mode, the third output mode, and the fourth output mode, as described above.

Thus, for the message acquired by the first acquisition unit 18A, the determination unit 18D determines any one of the first output mode, the second output mode, the third output mode, and the fourth output mode for each notified user on the basis of the importance judged by the judgment unit 180.

For example, the determination unit 18D determines the first output mode having the longest reproduction time for the message of the highest importance. The determination unit 18D also determines the fourth output mode having the shortest reproduction time for the message of the lowest importance.

For example, three levels of importance "high", "medium", and "low" are defined. In this case, the determination unit 18D determines the first output mode (outputting an entire message) for a message of the "high" importance. The determination unit 18D also determines the fourth output mode for a message of the "low" importance. The above determination is an example.

The determination unit 18D then stores the determined output mode in the output management information 42 (refer to FIG. 4) in a manner associated with the message ID of the message to be notified, and the user ID of the user notified of the message, the user ID having been identified by the judgment unit 18C in judging the importance. In this case, the determination unit 18D may assign a new output ID to each combination of a message ID and a user ID.

The determination unit 18D may determine the output mode of a message to be used for each of the users notified of the message on the basis of the importance and the state information indicating the current state of the user notified of the message.

The state information is estimated by the estimation unit 18H.

The estimation unit 18H estimates the state information by using detection information acquired by the second acquisition unit 18G.

The second acquisition unit 18G receives detection information and a user ID from each of one or more terminal devices 14 through the network 16 and the communication unit 22 every certain time. The detection information is a parameter used for estimating the current state of a user. Specifically, the detection information includes at least one of the noise level of the environment where the user is currently located, the illuminance level of the environment, the temperature of the environment, the humidity of the environment, the current location of the user, the current posture of the user, and the biological information of the user. Examples of the biological information include heart rate, skin resistance value, and body temperature.

The second acquisition unit 18G acquires, every certain time, detection information and a user ID through the communication unit 22 from each of all the terminal devices 14 in a communicable environment among a plurality of terminal devices 14 included in the communication support system 10.

The second acquisition unit 18G then stores the acquired user ID and detection information in the storage unit 20 in a manner associated with the acquisition time. Thus, the storage unit 20 stores therein a user ID and detection information by acquisition time in a manner associated with one another. The second acquisition unit 18G may store, in the storage unit 20, a detection time at which each piece of information included in the detection information is detected, instead of the acquisition time. In this case, the second acquisition unit 18G may acquire detection information, detection time, and a user ID from the terminal device 14.

The estimation unit 18H estimates the state information indicating the current state of the user notified of the message on the basis of the detection information. Specifically, the estimation unit 18H reads the detection information corresponding to the latest (that is, the current) acquisition time of the user ID of the user notified of the message, the user ID having been identified by the judgment unit 18C in judging the importance. The estimation unit 18H then estimates the current state information of each user notified of the message by using the read detection information.

In the present embodiment, the estimation unit 18H estimates the state information of each user notified of the message on the basis or a noise level, an illuminance level, a temperature, a humidity, a current location, a posture, biological information, or other information.

Specifically, the estimation unit 1801 estimates, on the basis of the detection information, the state information that is indicated by a plurality of levels indicating states from a state in which a user can check entire content of a notified message, to a state in which a user cannot check a message at all or a user does not need to check a message.

In the following, the state information indicates any one of the "state in which a user can check entire message content", the "state in which a user can check part of message content", the "state in which a user cannot check a message", and the "state in which a user does not need to check a message", as described above.

The degree at which a user can check a message, which is indicated by the state information, decreases in the order of the "state in which a user can check entire message content", the "state in which a user can check part of message content", the "state in which a user cannot check a message", and the "state in which a user does not need to check a message".

For example, the estimation unit 18H estimates the state in which a user can check entire message content when the noise level is lower. The estimation unit 18H also estimates the state in which a user cannot check a message, or the state in which a user does not need to check a message when the noise level is higher.

The estimation unit 18H also estimates a state in which a user can check message content when the illuminance level is higher. The estimation unit 18H also estimates the state in which a user cannot check a message, or a state in which a user does not need to check a message when the illuminance level is lower.

The estimation unit 18H also estimates the state in which a user can check message content when the temperature of an environment and the humidity of an environment indicate values in a normal range in which a person can think comfortably. The estimation unit 18H also estimates the state in which a user cannot check a message, or a state in which a user does not need to check a message when the temperature of an environment and the humidity of an environment deviate from the normal range.

The estimation unit 18H also estimates state information on the basis of whether the current location of a user is in a predetermined area, the distance between the current location of the user and the area, or other parameters.

The estimation unit 18H also estimates the state in which a user can check entire message content when the current posture of the user is a posture in which the user can satisfactorily check a message output from the terminal device 14. The estimation unit 18H also estimates the state in which a user cannot check a message, or a state in which a user does not need to check a message when the current posture of the user is a posture in which the user is difficult to check a message output from the terminal device 14.

The estimation unit 18H also estimates the state in which a user can check entire message content when the biological information of the user is in a normal condition range. The estimation unit 18H also estimates the state in which a user cannot check a message, or a state in which a user does not need to check a message when the biological information of the user is outside the normal condition range.

The estimation unit 18H may estimate the state information on the basis of one value or a combination of a plurality of values among a noise level, an illuminance level, a temperature, a humidity, a current location, a posture, and biological information contained in the detection information.

For example, the estimation unit 18H preliminarily stores, in the storage unit 20, state information and one value or a combination of a plurality of values among a noise level, an illuminance level, a temperature, a humidity, a current location, a posture, and biological information contained in the detection information, in a manner associated with each other. At this time, the estimation unit 18H preliminarily stores the state information in the storage unit 20 in a manner associated with a combination of parameters such that a combination of parameters that ensures higher possibility or checking a message causes the "state in which a user can check entire message content" or a state close to such state to be estimated. The estimation unit 18H may then estimate state information by reading, from the storage unit 20, the state information corresponding to the detection information.

The estimation unit 18H may include a learning function that learns state information depending on a combination of detection information contents or on the characteristics of a user. The estimation unit 18H may then estimate state information on the basis of a user targeted for estimation, detection information, and a leaning result.

The estimation unit 18H may estimate state information of a user by acquiring, as detection information, information that can be acquired from an existing information system such as a conference reservation system and an attendance management system. The estimation unit 18H may use a known method (for example, a method described in JP-A 2013-167806 (KOKAI) to estimate state information of a user.

The estimation unit 18H stores the estimated state information in the output management information 42 (refer to FIG. 4) in a manner associated with the message ID of the message to be notified, and the user ID of the user notified of the message, the user ID having been identified by the judgment unit 18C in judging the importance.

The determination unit 18D may then determine an output mode on the basis of the importance of the message acquired by the first acquisition unit 18A (refer to FIG. 3) and the state information of a user notified of the message (refer to FIG. 4).

In this case, the determination unit 18D determines the first output mode having the longest reproduction time when the importance is highest ("high" in the present embodiment) and the state information indicates the "state in which a user can check entire message content".

The determination unit 18D also determines the "fourth output mode" in which the message is not reproduced, when the importance is lowest ("low" in the present embodiment) and the state information indicates the "state in which a user does not need to check a message".

The determination unit 18D also determines the "second output mode" in which the type information is output, when the importance is approximately medium ("medium" in the present embodiment) and the state information indicates the "state in which a user can check part of message content". The determination unit 18D also determines the "third output mode" in which the reception information is output, when the importance is approximately medium ("medium" in the present embodiment) and the state information indicates the "state in which a user cannot check a message".

As described above, the determination unit 18D determines the "first output mode" having the longest reproduction time when the importance is higher, or the state information indicates the "state in which a user can check entire message content".

The determination unit 18D also determines the "fourth output mode" or the "third output mode" having a short reproduction time when the importance is lower, or the state information indicates the "state in which a user cannot check a message" or the "state in which a user does not need to check a message".

The output control unit 18E controls an output unit 28 (to be described later in detail) to output a message in an output mode determined by the determination unit 18D.

In the present embodiment, the output control unit 18E transmits a message in an output mode determined by the determination unit 18D to the terminal device 14 carried by each user notified of the message acquired by the first acquisition unit 18A.

For example, the output control unit 18E transmits, as it is, the entire message acquired by the first acquisition unit 18A to the terminal device 14 of the user identified by the user ID "B" for which the "first output mode" has been determined. Upon receiving the message, the terminal device 14 outputs the entire content of the received message.

The output control unit 18E also transmits the type information of the message acquired by the first acquisition unit 18A to the terminal device 14 of the user identified by the user ID "C" for which the "second output mode" has been determined. Upon receiving the type information, the terminal device 14 outputs the received type information (for example, "progress report").

The output control unit 18E also transmits the reception information (for example, a reception sound) of the message acquired by the first acquisition unit 18A to the terminal device 14 of the user identified by the user ID "D" for which the "third output mode" has been determined. Upon receiving the reception information, the terminal device 14 outputs the reception information (for example, a reception sound).

After controlling the output unit 28 to output the message in a determined output mode, the output control unit 18E changes, to "completed", the output state corresponding to the applicable output ID in the output management information 42.

The output control unit 18E may change an output mode according to a change instruction from the terminal device 14. Specifically, the reception unit 18F receives a change instruction for an output mode.

In the present embodiment, the reception unit 18F receives a change instruction for an output mode from the terminal device 14.

Upon receiving a change instruction, the output control unit 18E controls the output unit 28 in the terminal device 14 to output a message in an output mode other than the output mode used in the previous output control. Specifically, the output control unit 18E controls the output unit 28 in the terminal device 14 that has transmitted the change instruction to output a message in an output mode other than the output mode used in the previous output control.

For example, the output control unit 18E identifies, in the output management information 42 (refer to FIG. 4), the output ID corresponding to the user ID of the terminal device 14 that has transmitted the change instruction, the output ID associated with the output mode used in the previous transmission to the terminal device 14. The output control unit 18E then changes the output mode corresponding to the identified output ID to an output mode having a reproduction time that is one level longer.

As described above, the output modes have respective reproduction times of a message that decrease in the order of the first output mode, the second output mode, the third output mode, and the fourth output mode. Thus, when the output mode that has been used in the previous output control is the third output mode, the output control unit 18E changes the output mode to the second output mode. Every time the output control unit 18E receives a change instruction, the output control unit 18E also changes the output mode by one level in the order of the fourth output mode, the third output mode, the second output mode, and the first output mode.

The output control unit 18E then controls the output unit 28 in the terminal device 14 that has transmitted the change instruction to output a message in the changed output mode.

The example illustrated in FIG. 4 describes a case in which the output control unit 18E assigns a new output ID to the changed output mode and stores them in the output management information 42. The output control unit 18E, however, may overwrite the output mode before change with the changed output mode and register the changed output mode in the output management information 42.

The control unit 18 preferably includes the change unit 18I. The change unit 18I changes the importance of a message.

For example, the change unit 18I reads the message IDs corresponding to the output state "not completed" in the output management information 42 (refer to FIG. 4). The change unit 18I then identifies, in the message management information 40 (refer to FIG. 3), the importance corresponding to each of the read message IDs. The change unit 18I then changes the importance of the message identified by the message ID.

For example, the change unit 18I determines whether the message identified by a message ID corresponding to the output state "not completed" contains date-and-time information. The date-and-time information is information that indicates a due date, a deadline, or other date and time. The date-and-time information is information that indicates, for example, day/month/year or minute/hour/day/month/year.

For example, when the message contains a statement "please finish by August 10", the change unit 18I determines that the message contains date-and-time information of "August 10".

When the message contains date-and-time information, the change unit 18I determines whether the date and time indicated by the date-and-time information is earlier than the current date and time, and whether the difference between the current date and time and the date and time indicated by the date-and-time information is equal to or smaller than a first threshold. The first threshold may preliminarily be set to any value. When the change unit 18I determines that the difference is equal to or smaller than the first threshold, the change unit 18I changes the importance corresponding to the message registered in the message management information 40, to a higher level.

Thus, the change unit 18I can change the importance of a message to a higher level when the date and time indicated by the date-and-time information contained in the message is near the current date and time.

The change unit 18I may also change the importance when a message contains date-and-time information, and the date and time indicated by the date-and-time information is later than the current date and time.

For example, the change unit 18I determines whether the message identified by a message ID corresponding to the output state "not completed" contains date-and-time information. When the message contains date-and-time information, the change unit 161 determines whether the date and time indicated by the date-and-time information is later than the current date and time, and whether the difference between the current date and time and the date and time indicated by the date-and-time information is equal to or larger than a second threshold. The second threshold may preliminarily be set to any value. When the change unit 18I determines that the difference is equal to or larger than the second threshold, the change unit 18I changes the importance corresponding to the message registered in the message management information 40, to a lower level.

Thus, the change unit 18I can change the importance of a message to a lower level when the date and time indicated by the date-and-time information contained in the message is a past date and time, and an elapsed time from the date and time indicated by the date-and-time information is long.

Alternatively, the change unit 18I may change the importance according to an elapsed time from acquisition of a message by the first acquisition unit 18A.

In this case, the change unit 18I calculates the elapsed time from the acquisition time of the message identified by a message ID corresponding to the output state "not completed". When the calculated elapsed time is equal to or larger than a third threshold, the change unit 18I changes the importance of the message to a lower level. The third threshold may preliminarily be set. The third threshold is preferably a value, for example, larger than the second threshold.

Thus, the change unit 18I can change the importance of the message to a lower level when the elapsed time from the acquisition time of the message is long (equal to or larger than the third threshold).

Next, the following describes the terminal device 14.

As described in FIG. 2, the terminal device 14 includes a communication unit 24, a control unit 26, the output unit 28, an operation unit 30, a detection unit 32, an input unit 34, a drive unit 36, and a storage unit 38. The communication unit 24, the output unit 28, the operation unit 30, the detection unit 32, the input unit 34, the drive unit 36, and the storage unit 38 are connected to the control unit 26 in such a manner that signals can be exchanged.

The communication unit 24 communicates with the support device 12, another terminal device 14, an external device, and other devices over the network 16 in a wireless or wired manner.

The output unit 28 outputs various information. The output unit 28 is a speaker for outputting voice or a display unit for displaying an image. The output unit 28 may include both of a function for outputting voice and a function for displaying an image.

In the present embodiment, the output unit 28 outputs a message notified from the support device 12 in an output mode determined, by the support device 12. Specifically, the output unit 28 outputs a message, type information, or reception information.

The operation unit 30 is operated by a user and receives various instructions from the user. Examples of the operation unit 30 include a keyboard and a touch panel.

The detection unit 32 detects detection information of a user carrying the terminal device 14. As described above, the detection information includes at least one of the noise level of the environment where the user is currently located, the illuminance level of the environment, the temperature of the environment, the humidity of the environment, the current location of the user, the current posture of the user, and the biological information of the user.

Thus, the detection unit 32 may be a unit that includes a function capable of detecting at least one of the noise level of the environment where the user is currently located, the illuminance level of the environment, the temperature of the environment, the humidity of the environment, the current location of the user, the current posture of the user, and the biological information of the user.

For example, the detection unit 32 may include at least one of a microphone, an illuminance sensor, a temperature sensor, a humidity sensor, a global positioning system (GTS), a gyro sensor, an ultrasonic sensor, a contact sensor, a heart rate sensor, a skin resistance sensor, an acceleration sensor, and a digital camera (imaging device).

The detection unit 32 detects detection information every certain time and outputs the detection information to the control unit 26. The control unit 26 transmits the detection information detected by the detection unit 32, the detection time, and the user ID of the user operating the terminal device 14 to the support device 12 through the communication unit 24 and the network 16.

The input unit 34 receives a message input from a user. When the message is voice data, the input unit 34 is a microphone. In this case, specifically, the input unit 34 includes a microphone, an amplifier (signal amplifier), analog/digital (A/D) converter, a memory, or other components. The input unit 34 converts a waveform of voice uttered by the user to voice data, and outputs the voice data to the control unit 26. When a message is video data, the input unit 34 is an imaging apparatus capable of imaging a video.

The drive unit 36 causes the terminal device 14 to vibrate or generate heat. When the drive unit 36 is driven by the control performed by the control unit 26, vibration or a temperature change is caused in the terminal device 14.

The output unit 28 and the input unit 34 may be in a form attachable to the head of a user or other parts.

The storage unit 38 stores therein various data.

The control unit 26 controls the entire terminal device 14. For example, the control unit 26 receives a message, type information, or reception information from the support device 12 through the communication unit 24 and the network 16. The control unit 26 then outputs the received message, type information, or reception information from the output unit 28.

Thus, the output unit 28 in the terminal device 14 is controlled by the support device 12 to output a message in an output mode determined by the determination unit 18D in the support device 12.

Upon receiving a message (voice data or video data) from the input unit 34 input by an operation performed by a user, the control unit 26 transmits the input message and the user ID of the user to the support device 12 through the communication unit 24 and the network 16.

The control unit 26 preliminarily stores the user ID of a user who operates the terminal device 14 in the storage unit 38. The control unit 26 may then transmits, as the user ID of the input message, the user ID stored in the storage unit 38 to the support device 12. The input unit 34 may be provided, with a user identification function. In this case, the control unit 26 may acquire a message and the user ID of a user of a transmission source from the input unit 34, and transmit the acquired information to the support device 12. The control unit 26 may use, as the user ID of a user of a transmission source, the user ID input by an operation of the operation unit 30 at the time of inputting of a message by the user.

Every time the detection unit 32 detects detection information, the control unit 26 transmits the detected detection information and user ID to the support device 12 through the communication unit 24 and the network 16.

Next, the following describes output control processing performed by the control unit 18 in the support device 12.

Figure 7:
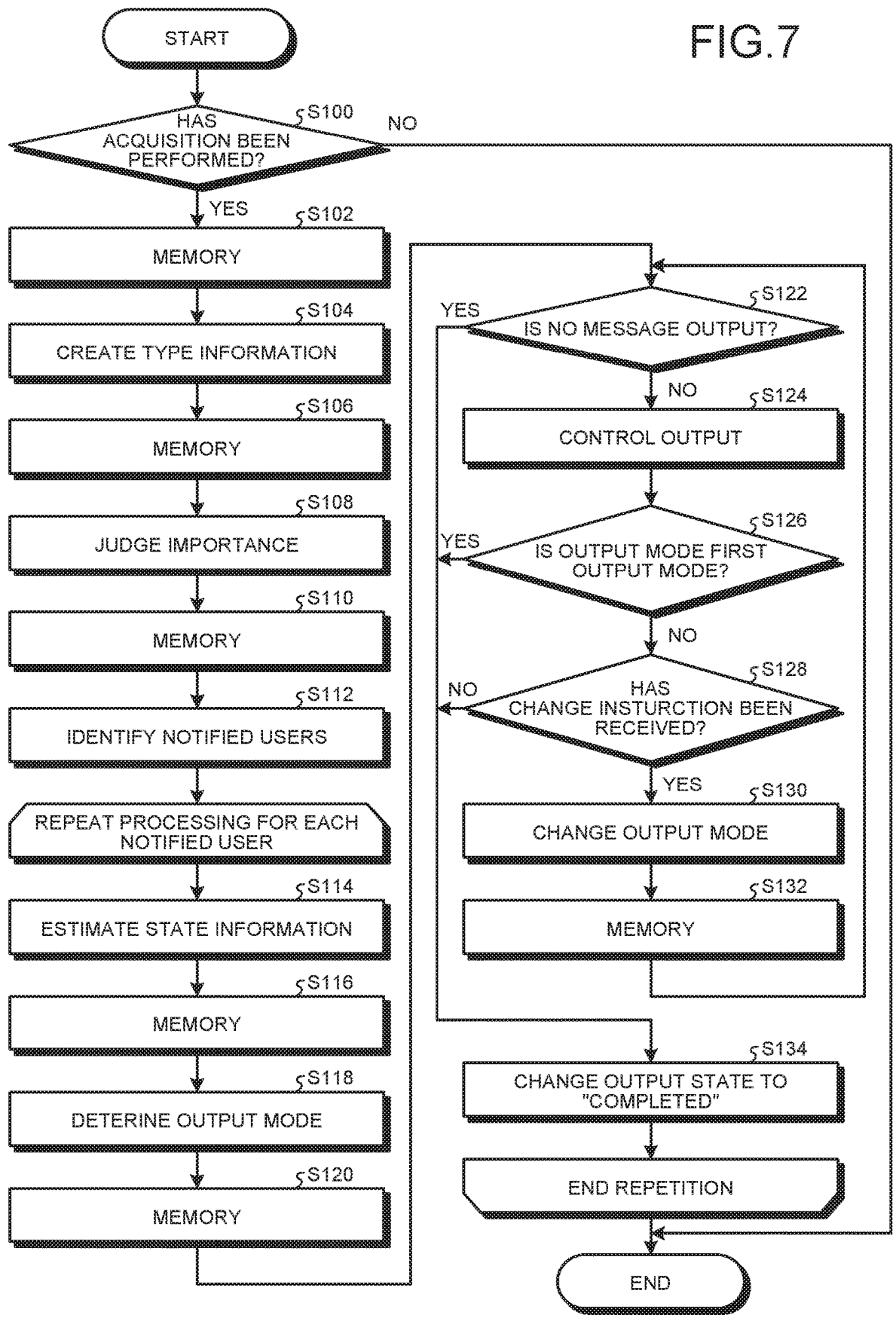
FIG. 7 is a flowchart illustrating an exemplary procedure of output control processing.

FIG. 7 is a flowchart illustrating an exemplary procedure of output control processing performed by the control unit 18 in the support device 12. The support device 12 repeats the output control processing illustrated in FIG. 7.

First, the first acquisition unit 18A determines whether a message has been acquired from any terminal device 14 (Step S100). In the present embodiment, the first acquisition unit 18A determines whether a message and a user ID have been acquired from any terminal device 14.

If the first acquisition unit 18A determines No at Step S100 (No at Step S100), this routine is ended. If the first acquisition unit 18A determines Yes at Step S100 (Yes at Step S100), the processing proceeds to Step S102.

At Step S102, the first acquisition unit 18A assigns a message ID to the acquired message. The first acquisition unit 18A then stores the message ID, the acquired message, the user ID of the user of the transmission source of the message, and the acquisition time of the message in the message management information 40 in a manner associated with one another (Step S102) (refer to FIG. 3).

Next, the creation unit 18B creates type information of the message acquired at Step S100 (Step S104). The creation unit 18B then stores the created type information in the message management information 40 in a manner associated with the message used for creating the type information (Step S106) (refer to FIG. 3).

Next, the judgment unit 18C judges the importance of the message acquired at Step S100 (Step S108). The judgment unit 18C then stores the judged importance in the message management information 40 in a manner associated with the message used for the judgment (Step S110) (refer to FIG. 3).

Next, the judgment unit 18C identifies users notified of the message acquired at Step S100 (Step S112).

The control unit 18 then repeats the processing from Step S114 to Step S134 for each of the user IDs of the notified users identified at Step S112.

Specifically, first, the estimation unit 18H estimates state information of the notified user by using detection information acquired by the second acquisition unit 18G (Step S114). Next, the estimation unit 18H stores the estimated state information in the output management information 42 in a manner associated with the message ID of the message acquired at Step S100, and the user ID of the notified user (Step S116) (refer to FIG. 4).

Next, the determination unit 18D determines an output mode (Step S118). As described above, for example, the determination unit 18D determines an output mode on the basis of the importance of the message acquired by the first acquisition unit 18A (refer to FIG. 3) and the state information of the user notified of the message (refer to FIG. 4).

The determination unit 18D then stores the determined output mode in the output management information 42 in a manner associated with the message ID of the message acquired at Step S100, and the user ID of the notified user (Step S120) (refer to FIG. 4).

Next, the output control unit 18E determines whether the output mode determined at Step S118 is the fourth output mode indicating that no message is output (Step S122). If the output control unit 18E determines that the output mode is the fourth output mode (Yes at Step S122), the processing proceeds to Step S134.

At Step S134, the output control unit 18E changes the "output state" corresponding to the user ID of the notified user and the output ID that are target for output, to "completed" (Step S134).

If the output control unit 18E determines that the output mode is not the fourth output mode at Step S122 (No at Step S122), the processing proceeds to Step S124. The output control unit 18E controls the output unit 28 in the terminal device 14 of the notified user to output the message in the output mode (the first output mode, the second output mode, or the third output mode) determined at Step S118 (Step S124).

Next, the output control unit 18E determines whether the output mode determined at Step S118 is the first output mode (Step S126). If the output control unit 18E determines that the output mode is the first output mode (Yes at Step S126), the processing proceeds to Step S134. If the output control unit 18E determines that the output mode is not the first output mode (No at Step S126), the processing proceeds to Step S128.

At Step S128, the change unit 18I determines whether a change instruction has been received from the terminal device 14 on which the output control has been performed at Step S124 (Step S128). For example, the change unit 18I performs the determination at Step S128 by determining whether a change instruction has been received from the terminal device 14 within a predetermined time from the time at which the output control was performed at Step S124.

If the change unit 18I determines that a change instruction has not been received (No at Step S128), the processing proceeds to Step S134. If the change unit 18I determines that a change instruction has been received (Yes at Step S128), the processing proceeds to Step S130.

At Step S130, the output control unit 18E changes the output mode used in the output control performed at the previous Step S124, to another output mode having a reproduction time that is one level longer (Step S130). The output control unit 18S then stores the changed output mode in the output management information 42 in a manner associated with the user ID of the user notified of the message and the message ID of the message (Step S132) (refer to FIG. 4). The processing then returns to Step S122.

That is, the output control unit 18S performs the processing from Step S122 to Step S126 described above by using the output mode changed at Step S130. Thus, the output control unit 18S controls the output unit 28 in the terminal device 14 to output the message in the output mode changed by the change instruction received at Step S128.

The control unit 18 then performs the processing from Step S114 to Step S134 for each of the user IDs of the notified users identified at Step S112, and this routine is ended.

Figure 8:
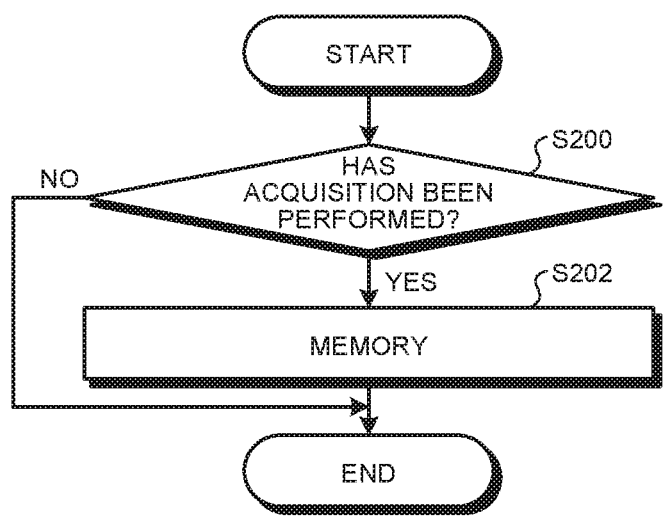
FIG. 8 is a flowchart illustrating an exemplary procedure of detection information acquisition processing.

Next, the following describes detection information acquisition processing performed by the control unit 18 in the support device 12. FIG. 8 is a flowchart illustrating an exemplary procedure of detection information acquisition processing. The control unit 18 repeats the detection information acquisition processing illustrated in FIG. 8 as interruption processing.

The second acquisition unit 18G determines whether detection information and a user ID have been received from the terminal device 14 (Step S200). If the second acquisition unit 18G determines No at Step S200 (No at Step S200), this routine is ended. If the second acquisition unit 18G determines Yes at Step S200 (Yes at Step S200), the processing proceeds to Step S202.

The second acquisition unit 18G stores the acquired user ID and detection information in the storage unit 20 in a manner associated with the acquisition time (Step S202). Thus, the storage unit 20 stores therein a user ID and detection information by acquisition time in a manner associated with one another. This routine is then ended.

Figure 9:
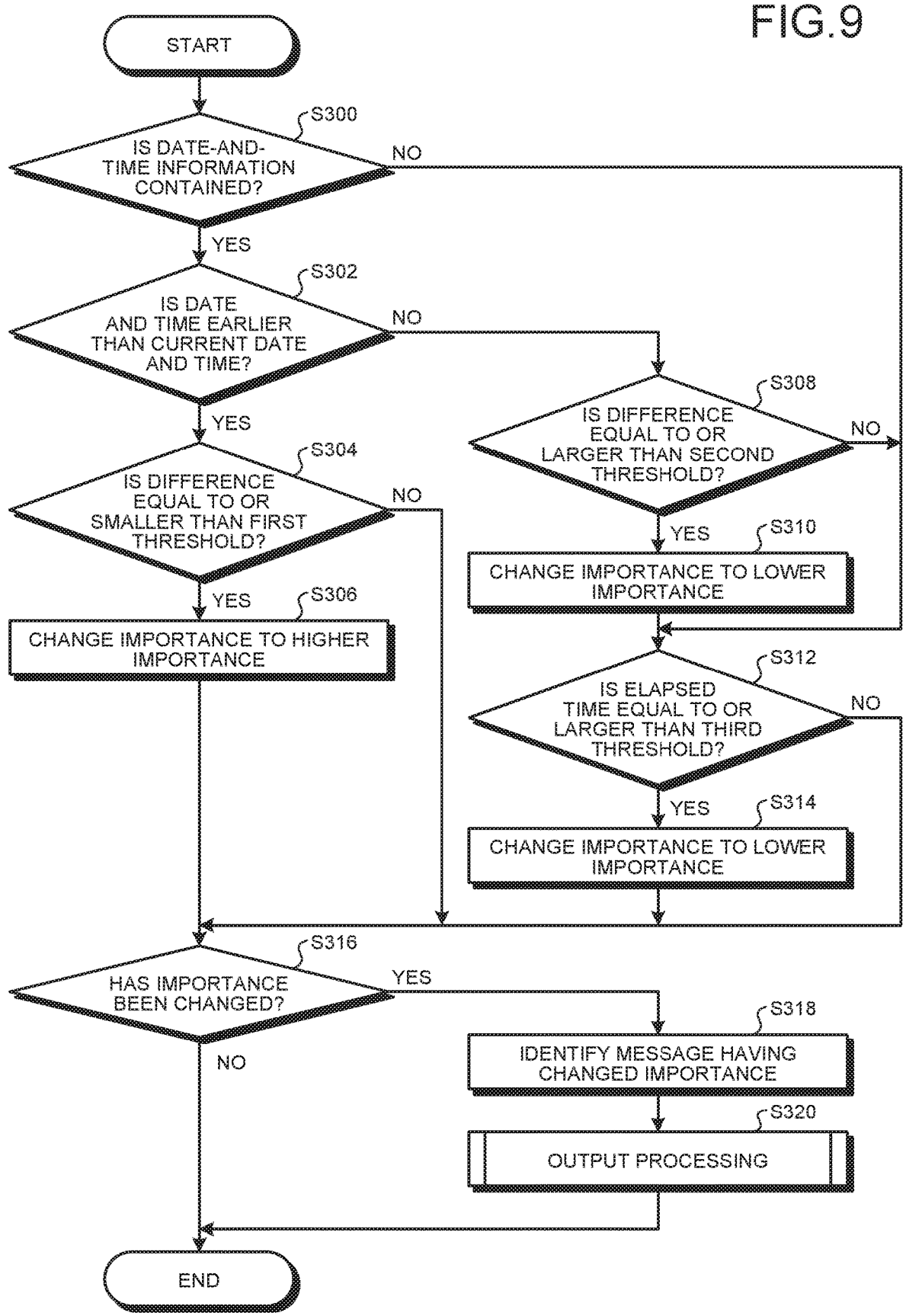
FIG. 9 is a flowchart illustrating an exemplary procedure of importance change processing.

Next, the following describes importance change processing performed by the control unit 18 in the support device 12. FIG. 9 is a flowchart illustrating an exemplary procedure of importance change processing. The control unit 18 repeats the importance change processing illustrated in FIG. 9 as interruption processing every certain time. The certain time may preliminarily be set.

First, the change unit 18I reads the message IDs corresponding to the output state "not completed" in the output management information 42 (refer to FIG. 4). The control unit 18 then performs the processing from Step S300 to Step S320 for each of the read message IDs.

The change unit 18I determines whether the message identified by the message ID corresponding to the output state "not completed" contains date-and-time information (Step S300). If the change unit 18I determines that date-and-time information is not contained (No at Step S300), the processing proceeds to Step S312 to be described later. If the change unit 18I determines that date-and-time information is contained (Yes at Step S300), the processing proceeds to Step S302.

At Step S302, the change unit 18I determines whether the date and time indicated by the date-and-time information is earlier than the current date and time (Step S302). If the change unit 18I determines that the date and time is earlier than the current date and time (Yes at Step S302), the processing proceeds to Step S304.

At Step S304, the change unit 18I determines whether the difference between the current date and time and the date and time indicated by the date-and-time information is equal to or smaller than the first threshold (Step S304). If the change unit 18I determines that the difference is larger than the first threshold (No at Step S304), the processing proceeds to Step S316 to be described later. If the change unit 18I determines that the difference is equal to or smaller than the first threshold (Yes at Step S304), the processing proceeds to Step S306.

At Step S306, the change unit 18I changes the importance of the message identified by the message ID that is the target for the processing, to a higher level (for example, one level higher) than the currently set importance (Step S306). For example, when the current importance is "medium", the change unit 18I changes the importance to "high". The processing then proceeds to Step S316 to be described later.

In the present embodiment, changing importance by the change unit 18I means changing the importance corresponding to the message that is the target of the importance change processing in the message management information 40 (refer to FIG. 3).

If the change unit 18I determines that the date-and-time information contained in the message is later than the current date and time at Step S302 described above (No at Step S302), the processing proceeds to Step S308. At Step 3308, the change unit 18I determines whether the difference between the current date and time and the date and time indicated by the date-and-time information is equal to or larger than the second threshold (Step S308).

If the change unit 18I determines that the difference is smaller than the second threshold (No at Step S308), the processing proceeds to Step S312 to be described later. If the change unit 18I determines that the difference is equal to or larger than the second threshold (Yes at Step S308), the processing proceeds to Step S310.

At Step S310, the change unit 18I changes the importance of the message identified by the message ID that is the target for the processing, to a lower level (for example, one level lower) than the currently set importance (Step S10). For example, when the current importance is "medium", the change unit 18I changes the importance to "low". The processing then proceeds to Step S312.

At Step S312, the change unit 18I determines whether an elapsed time from the acquisition time of the message identified by the message ID that is a target for the processing is equal to or larger than the third threshold, the acquisition being performed by the first acquisition unit 18A (Step S312).

If the change unit 18I determines that the elapsed time is equal to or larger than the third threshold (Yes at Step S312), the change unit 18I changes the importance of the message identified by the message ID that is the target for the processing, to a lower level (for example, one level lower) than the currently set importance (Step S314). For example, when the current importance is "medium", the change unit 18I changes the importance to "low". The processing then proceeds to Step S316. If the change unit 18I determines No at Step S312 (No at Step S312), the processing proceeds to Step S316.

At Step S316, the output control unit 18E determines whether importance in the message management information 40 has been changed by the change unit 18I (Step S316). If the output control unit 18E determines that no importance has been changed (No at Step S316), this routine is ended.

If the output control unit 18E determines that importance has been changed (Yes at Step S316), the processing proceeds to Step S318. At Step S318, the judgment unit 18C identifies the message having the changed importance (Step S318).

The control unit 18 performs output processing on the message having the changed importance (Step S320). The output processing at Step S320 corresponds to the processing from Step S112 to Step S134 in the output control processing illustrated in FIG. 7. This routine is then ended.

Next, the following describes a procedure of processing performed by the control unit 26 in the terminal device 14.

Figure 10:
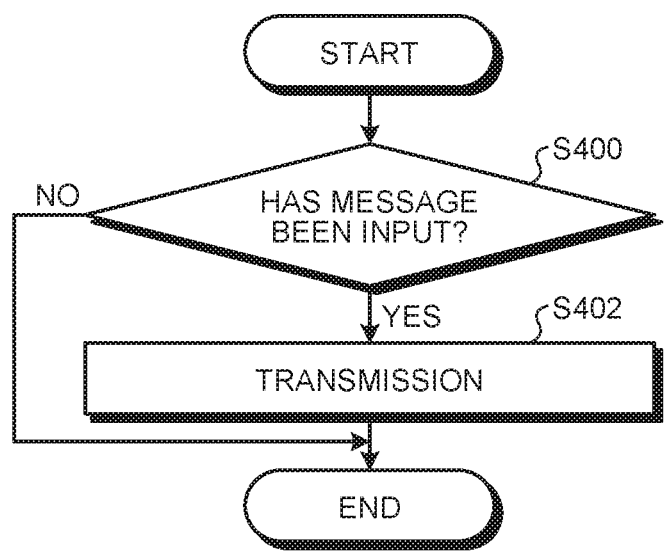
FIG. 10 is a flowchart illustrating a procedure of message transmission processing.

FIG. 10 is a flowchart illustrating a procedure of message transmission processing performed by the control unit 26 in the terminal device 14. The control unit 26 repeats the message transmission processing illustrated in FIG. 10.

The control unit 26 determines whether a message has been input from the input unit 34 (Step S400). If the control unit 26 determines No at Step S400 (No at Step S400), this routine is ended. If the control unit 26 determines Yes at Step S400 (Yes at Step S400), the processing proceeds to Step S402.

At Step S402, the control unit 26 transmits, to the support device 12, the message input, at Step S400 and the user ID of the user of the transmission source of the message (Step S402). The user ID of the user of the transmission source of a message is, for example, the same as the user ID of the user of the terminal device 14 including the control unit 26. The user ID of each terminal device 14 may preliminarily be stored in the storage unit 38. This routine is then ended.

Figure 11:
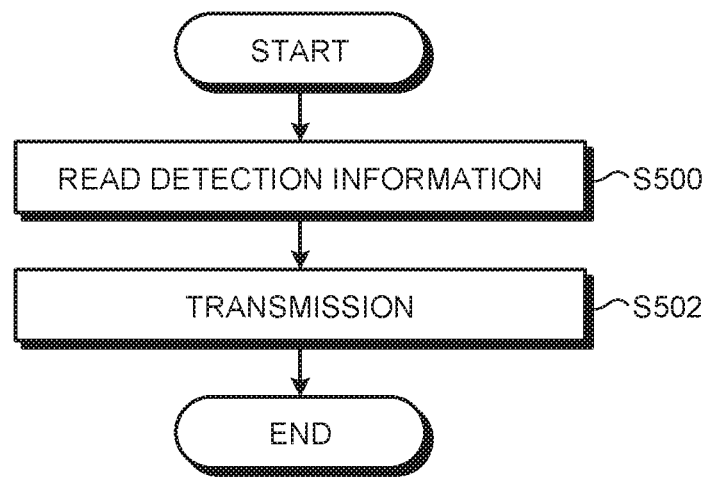
FIG. 11 is a flowchart illustrating a procedure of detection information transmission processing.

FIG. 11 is a flowchart illustrating a procedure of detection information transmission processing performed by the control unit 26 in the terminal device 14. The control unit 26 repeats the detection information transmission processing illustrated in FIG. 11.

Every time the detection unit 32 detects detection information, the control unit 26 reads the detected detection information (Step S500). The control unit 26 then transmits, to the support device 12, the read detection information and the user ID of the user of the terminal device 14 including the control unit 26 (Step S502). This routine is then ended.

Figure 12:
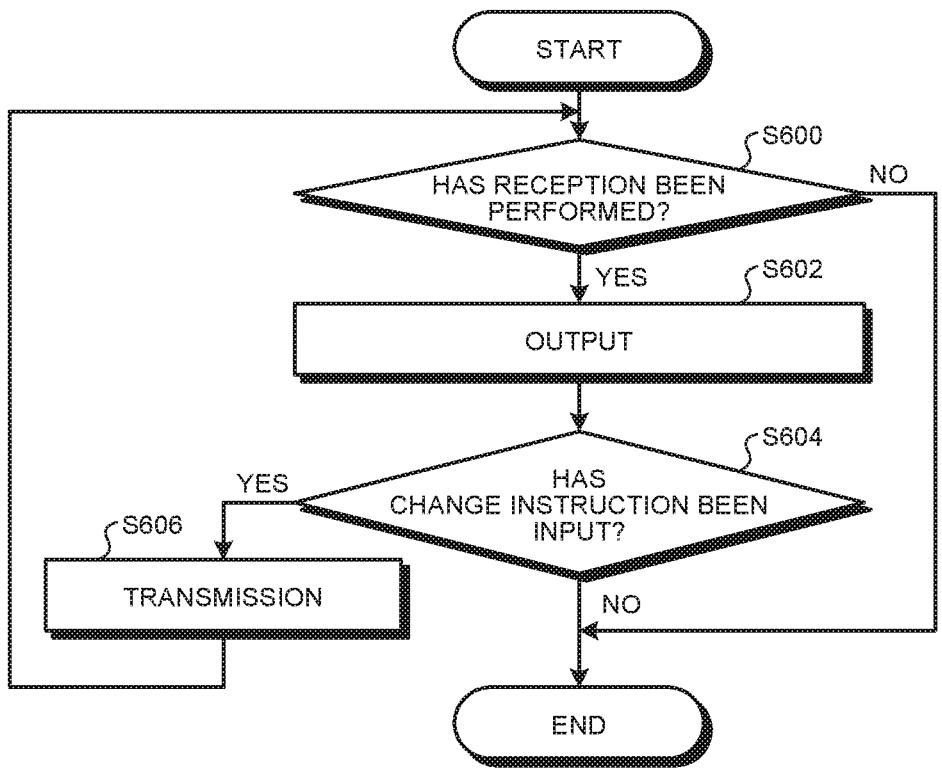
FIG. 12 is a flowchart illustrating a procedure of message output processing.

Next, the following describes a procedure of message output processing performed by the control unit 26 in the terminal device 14. FIG. 12 is a flowchart illustrating a procedure of message output processing performed by the control unit 26.

First, the control unit 26 determines whether a message, type information, or reception information has been received from the support device 12 (Step S600). If the control unit 26 determines No at Step S600 (No at Step S600), this routine is ended.

If the control unit 26 determines Yes at Step S600 (Yes at Step S600), the processing proceeds to Step S602. At Step S602, the control unit 26 outputs the message, the type information, or the reception information received at Step S600 from the output unit 28 (Step S602).

Thus, the terminal device 14 outputs the message in an output mode determined by the support device 12.

Next, the control unit 26 determines whether a change instruction has been input (Step S604). The control unit 26 performs the determination at Step S604 by determining whether a change instruction has been received from the operation unit 30.

At Step S604, the control unit 26 may determine whether a change instruction has been received within certain time from the time at which the output was performed at Step S602. During the certain time, the control unit 26 may perform various processing for prompting the user to perform change.

For example, the control unit 26 may vibrate a body of the terminal device 14 by driving the drive unit 36. The control unit 26 may also cause the output unit 28 to generate continuous or intermittent sound. In this manner, the control unit 26 may present to a user that the terminal device 14 is waiting for an input of operation instruction from the user.

If the control unit 26 determines Yes at Step S604 (Yes at Step S604), the processing proceeds to Step S606. At Step S606, the control unit 26 transmits the change instruction to the support device 12 (Step S606). At this time, the control unit 26 may transmit, to the support device 12, the change instruction and the user ID of the terminal device 14 including the control unit 26. The processing then returns to Step S600 described above.

If the control unit 26 determines No at Step S604 (No at Step S604), this routine is ended.

With the above-described processing (the processing illustrated in FIG. 7 to FIG. 12) performed by the support device 12 and the terminal device 14, a message notified to a user can be output in an output mode corresponding to the importance of the message.

Next, the following describes exemplary operation of the communication support system 10 according to the present embodiment with reference to specific examples.

An exemplary case is described below in which the communication support system 10 is introduced into a work site. In this description, users who belong to a group and communicate with one another using the communication support system 10 are users A to F (the users identified by user IDs "A", "B", "C", "D", and "E", respectively).

The attributes of these users A to E are as presented in FIG. 5A, which are general user for the users A to C and manager (site manager, superior, etc.) of the users A to C for the users D and E.

For example, the user A who is a general user uses the terminal device 14 of the user A to input a voice of a message: "Installation work of part X has been started". In this case, the control unit 26 in the terminal device 14 transmits, to the support device 12, the user ID "A" and the message that is voice data containing the voice.

The first acquisition unit 18A of the control unit 18 in the support device 12 stores the acquired message and user ID in the message management information 40 (refer to FIG. 3) in a manner associated with the acquisition time. At this time, the first acquisition unit 18A assigns a message ID "M1a" to the message and stores the message and the message ID in the message management information 40.

The creation unit 18B of the control unit 18 creates type information "progress report" for the message and stores the type information in the message management information 40 (refer to FIG. 3). The judgment unit 18O judges the importance of the message to be "medium" on the basis of the message and the type information "progress report" and stores the importance in the message management information 40 (refer to FIG. 3).

As a result, the message management information 40 stores therein the message ID "M1a", the message "Installation work of part X has been started", the user ID "A" of the user of the transmission source, the acquisition time, the type information "progress report", and the importance "medium" in a manner associated with one another (refer to FIG. 3).

The judgment unit 18O identifies a user notified of the message who is identified by the message ID "M1a". For example, judgment unit 18O identifies, as the notified user, the users B to E belonging to the group "01" to which the user A belongs in the communication target management information 46 (refer to FIG. 5B).

The control unit 18 in the support device 12 then performs the processing from Step S114 to Step S134 illustrated in FIG. 7 for each of the users B to E.

First, the following describes a specific example of processing on the user B.

The estimation unit 18H estimates the state information of the notified user B by using detection information acquired by the second acquisition unit 18G. The result of the estimation is, for example, that the state information of the user B is the "state in which a user can check entire message content". In this case, the estimation unit 18H stores the estimated state information in the output management information 42 in a manner associated with a new output ID "N1b", the message ID "M1a", and the user ID "B" (refer to the row of the output ID "N1b" in FIG. 4).

The determination unit 18D determines an output mode for the message identified by the message ID "M1a" and notified to the user ID "B". In this case, the determination unit 18D determines the output mode to be the "first output mode" on the basis of the importance of the message "medium" and the state information of the user B "state in which a user can check entire message content". As described above, the first output mode is a mode for outputting an entire message.

The determination unit 18D stores the determined output mode "first output mode" in the output management information 42 in a manner associated with the output ID "N1b" (refer to FIG. 4). The output control unit 18E then controls the output unit 28 in the terminal device 14 of the user B to output the message "Installation work of part X has been started" in the determined output mode "first output mode".

That is, the output control unit 18E transmits the message "Installation work of part X has been started" to the terminal device 14 of the user B. Thus, the output unit 28 in the terminal device 14 of the user B outputs the voice of the message "Installation work of part X has been started".

The output control unit 18E then changes, to "completed", the output state corresponding to the output ID "N1b" in the output management information 42 (refer to FIG. 4). This change ends the message notification to the user B.

Next, the following describes a specific example of processing on the user C.

The estimation unit 18H estimates the state information of the notified user C by using detection information acquired by the second acquisition unit 18G. The result of the estimation is, for example, that the state information of the user C is the "state in which a user can check part of message content". In this case, the estimation unit 18H stores the estimated state information in the output management information 42 in a manner associated with a new output ID "N1c", the message ID "M1a", and the user ID "C" (refer to the row of the output ID "N1c" in FIG. 4).

The determination unit 18D determines an output mode for the message identified by the message ID "M1a" and notified to the user ID "C". In this case, the determination unit 18D determines the output mode to be the "second output mode" on the basis of the importance of the message "medium" and the state information of the user C "state in which a user can check part of message content". As described above, the second output mode is a mode for outputting type information of a message.

The determination unit 18D stores the determined output mode "second output mode" in the output management information 42 in a manner associated with the output ID "N1c" (refer to FIG. 4). The output control unit 18E then controls the output unit 28 in the terminal device 14 of the user C to output the message "Installation work of part X has been started" in the determined, output mode "second output mode".

That is, the output control unit 18E transmits the type information "progress report" of the message identified by the message ID "M1a" to the terminal device 14 of the user C. Thus, the output unit 28 in the terminal device 14 of the use C outputs the voice "progress report" that is the type information. That is, the output unit 28 in the terminal device 14 of the user C outputs the voice "progress report" that has a shorter reproduction time than that of the original message "Installation work of part X has been started" and is the information indicating the type of content of the message.

The output control unit 18E then changes, to "completed", the output state corresponding to the output ID "N1c" in the output management information 42 (refer to FIG. 4).

Here, it is assumed that a change instruction for the output mode is input according to an operation instruction from the user C through the operation unit 30. In this case, the control unit 26 in the terminal device 14 of the user C transmits, to the support device 12, the change instruction and the user ID "C".

Upon receiving the user ID "C" and the change instruction, the output control unit 18E in the support device 12 controls the output unit 28 in the terminal device 14 of the user C to change the output mode "second output mode" that has been used in the previous output control, to another output mode. For example, the output control unit 18E changes the output mode to the "first output mode" that has a longer reproduction time.

The output control unit 18E then controls the output unit 28 in the terminal device 14 of the user C to output the message identified by the message ID "M1a" in the "first output mode" after the change. That is, the output control unit 18E transmits the message "Installation work of part X has been started" to the terminal device 14.

The terminal device 14 of the user C receives the message. The terminal device 14 of the user C then outputs the message "Installation work of part X has been started" from the output unit 28.

In this manner, a message is output in a different output mode according to a change instruction from a user. A message can also be provided in an output mode changed in accordance with a change in the situation or a requirement of a user notified of the message.

The output control unit 18E may assign a new output ID (for example, the output ID "N2c") to the changed output mode and stores them in the output management information 42 (refer to FIG. 4). In this case, after controlling the output unit 28 to output the message in the changed output mode, the output control unit 18E may store the output state "completed" in the output management information 42 in a manner associated with the output ID "N2c". This process ends the message notification to the user C.

Next, the following describes a specific example of processing on the user D having the attribute "manager".

The estimation unit 18H estimates the state information of the notified user D by using detection information acquired by the second acquisition unit 18G. The result of the estimation is, for example, that the state information of the user D is the "state in which a user cannot check a message". In this case, the estimation unit 18H stores the estimated state information in the output management information 42 in a manner associated with a new output ID "N1d", the message ID "M1a", and the user ID "D" (refer to the row of the output ID "N1d" in FIG. 4).

The determination unit 18D determines an output mode for the message identified by the message ID "M1a" and notified to the user ID "D". In this case, the determination unit 18D determines the output mode to be the "third output mode" on the basis of the importance of the message "medium" and the state information of the user D "state in which a user cannot check a message". As described above, the third output mode is a mode for outputting reception information such as a reception sound.

The determination unit 18D stores the determined output mode "third output mode" in the output management information 42 in a manner associated with the output ID "N1d" (refer to FIG. 4). The output control unit 18E then controls the output unit 28 in the terminal device 14 of the user D to output the message "Installation work of part X has been started" in the determined output mode "third output mode".

That is, the output control unit 18E transmits reception information to the terminal device 14 of the user D. Upon receiving the reception information, the terminal device 14 of the user D outputs the reception information (for example, a reception sound) from the output unit 28.

The output control unit 18E then changes, to "completed", the output state corresponding to the output ID "N1d" in the output management information 42 (refer to FIG. 4).

It is assumed that a change instruction for the output mode is input according to an operation instruction from the user D through the operation unit 30. In this case, the control unit 26 in the terminal device 14 of the user D transmits, to the support device 12, the change instruction and the user ID "D".

Upon receiving the user ID "D" and the change instruction, the output control unit 18E in the support device 12 controls the output unit 28 in the terminal device 14 of the user D to change the output mode "third output mode" that has been used in the previous output control, to another output mode. For example, the output control unit 18E changes the output mode to the "second output mode" having a reproduction time that is one level longer.

The output control unit 18E then controls the output unit 28 in the terminal device 14 of the user ID "D" to output the message identified by the message ID "M1a" in the "second output mode" after the change. That is, the output control unit 18E transmits the type information "progress report" to the terminal device 14.

Thus, the output unit 28 in the terminal device 14 of the user D outputs the voice "progress report" that is the type information.

It is assumed that another change instruction for the output mode is input according to an operation instruction from the user D through the operation unit 30. In this case, the control unit 26 in the terminal device 14 of the user D transmits, to the support device 12, the change instruction and the user ID "D".

Upon receiving the user ID "D" and the change instruction, the output control unit 18E in the support device 12 controls the output unit 28 in the terminal device 14 of the user D to change the output mode "second output mode" that has been used in the previous output control, to the "first output mode" having a reproduction time that is one level longer.

The output control unit 18E then transmits the message "Installation work of part X has been started" to the terminal device 14 of the user ID "D". The terminal device 14 of the user D receives the message. The terminal device 14 of the user D then outputs the message "Installation work of part X has been started" from the output unit 28.

In this manner, a message is output in a different output mode according to a change instruction from a user. That is, a message is output in an output mode having a longer reproduction time according to a change instruction from a user, level by level. A message can also be provided in an output mode changed in accordance with a change in the situation or a requirement of a user notified of the message.

Next, the following describes a specific example of processing on the user E having the attribute "manager".

The estimation unit 18H estimates the state information of the notified user E by using detection information acquired by the second acquisition unit 18G. The result of the estimation is, for example, that the state information of the user E is the "state in which a user does not need to check a message". In this case, the estimation unit 18H stores the estimated state information in the output management information 42 in a manner associated with a new output ID "N1e", the message ID "M1a", and the user ID "E" (refer to the row of the output ID "N1e" in FIG. 4).

The determination unit 18D determines an output mode for the message identified by the message ID "M1a" and notified to the user ID "E". In this case, the determination unit 18D determines the output mode to be the "fourth output mode" on the basis of the importance of the message "medium" and the state information of the user F "state in which a user does not need to check a message". As described above, the fourth output mode is a mode for not outputting a message.

The determination unit 18D stores the determined output mode "fourth output mode" in the output management information 42 in a manner associated with the output ID "N1e" (refer to FIG. 4). The output control unit 18E then ends the processing on the user F without transmitting a signal to the user E.

As described above, the support device 12 according to the present embodiment includes the first acquisition unit 18A, the creation unit 18B, and the output unit 28. The first acquisition unit 18A acquires a message to be notified to a user. The creation unit 18B creates type Information that indicates the type of content of the message. The output unit 28 outputs the message in an output mode on the basis of the importance of the message among a plurality of output modes including at least the first output mode for outputting an entire message, the second output mode for outputting type information, and the third output mode for outputting reception information indicating reception of a message.

As described above, the support device 12 according to the present embodiment outputs a message, on the basis of the importance of the message, in the first output mode for outputting an entire message, the second output mode for outputting type information indicating the type of content of a message, or the third output mode for outputting reception information indicating reception of a message.

In this manner, the support device 12 according to the present embodiment can notify a user of a message in an output mode corresponding to the importance of the message. The user who has been notified of the message does not always need to check the entire content of the notified message, and can check the message in an output mode corresponding to the importance of the message.

Consequently, the support device 12 according to the present embodiment can support smooth communication.

The present embodiment has described a configuration in which the support device 12 and the output unit 28 are provided in the separate devices. The support device 12, however, may further include the output unit 28.

The above specific examples have also described a case in which a message is voice data. As described above, however, a message may be video data. In this case, type information that indicates the type of content of a message may be an image of a part of the video, information indicating a digest of the video, an image related to the video, or a character or a symbol indicating the type of content of the video.

The above embodiment has also provided the description in the assumption that the reproduction time of the type information of a message is shorter than that of the message. When, however, a message acquired by the first acquisition unit 18A is short, the difference between the reproduction time of type information created by the creation unit 18B and the reproduction time of the message may be equal to or smaller than a fifth threshold. The fifth threshold may preliminarily be set to a value that determines whether the effect in shortening the reproduction time is achieved.

Thus, when the difference between the reproduction time of type information created by the creation unit 18B and the reproduction time of the message is equal to or smaller than the fifth threshold, the output control unit 18E may perform the following control. That is, in this case, the output control unit 18E may control the output unit 28 to output the message in the first output mode for outputting the entire message when the output mode determined by the determination unit 18D is the second output mode for outputting type information.

The output control unit 18E may also control the output unit 28 to output the message in an output mode determined by the determination unit 18D when the difference between the reproduction time of type information created by the creation unit 18B and the reproduction time of the message is larger than the fifth threshold.

The above embodiment has also described a case in which the output unit 28 outputs a voice or an image. The output unit 28, however, may output a message by further combining at least one of vibration of the terminal device 14 and adjustment of the surface temperature of the terminal device 14.

The above embodiment has also described a case in which judgment of importance and determination of an output mode is performed on the basis of a message, type information, the attribute of a user of a transmission source, the attribute of a notified user, and other parameters.

The support device 12 (the judgment unit 18C and the determination unit 18D) may perform judgment of importance and determination of an output mode on the basis of other additional parameters. For example, judgment of importance and determination of an output mode may be performed on the basis of additional parameters such as transitions in detection information or state information of a user, and a personality or preference of a user.

Figure 13:
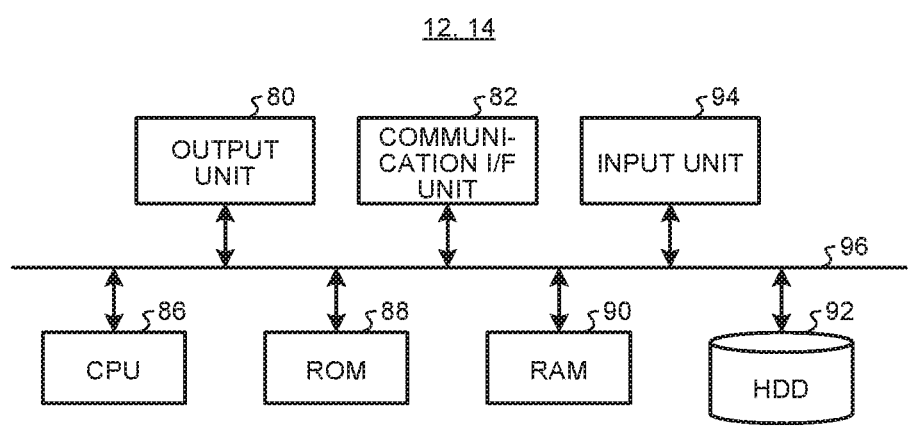
FIG. 13 is a block diagram illustrating an exemplary hardware configuration of a support device and a terminal device.

Next, the following describes a hardware configuration of the support device 12 and the terminal device 14 according to the present embodiment. FIG. 13 is a block diagram illustrating arm exemplary hardware configuration of the support device 12 and the terminal device 14 according to the present embodiment.

The support device 12 and the terminal device 14 according to the present embodiment include an output unit 80, a communication interface (17F) unit 82, an input unit 94, a central processing unit (CPU) 86, a read-only memory (ROM) 88, a random access memory (RAM) 90, and a hard disk drive (HDD) 92 that are connected to each other over a bus 96, and has a hardware configuration using a general computer.

The CPU 86 is a processor controlling the processing performed by the support device 12 and the processing performed by the terminal device 14 according to the present embodiment. The RAM 90 stores therein data necessary for various processing performed by the CPU 86. The ROM 88 stores therein computer programs or other data for implementing the various processing performed h the CPU 86. The HDD 92 stores therein data that are stored in the storage unit 20 and the storage unit 38 described above. The communication I/F unit 82 is an interface for exchanging data with another device. The communication I/F unit 82 corresponds to the communication unit 22 and the communication unit 24 described above.

The output unit 80 corresponds to the output unit 28 described above. The input unit 94 corresponds to the operation unit 30 and the input unit 34 described above, and receives an operation instruction from a user and acquires data.

The computer programs for executing the various processing executed in the support device 12 and the terminal device 14 according to the present embodiment are incorporated and provided in the ROM 88 or the like in advance.

The computer programs executed in the support device 12 and the terminal device 14 according to the present embodiment may also be recorded and provided in a computer-readable recording medium such as a compact disc read-only memory (CD-ROM), a flexible disk (FD), a compact disc recordable (CD-R), and a digital versatile disc (DVD), as a file in a format installable or executable in these devices.

Furthermore, the computer programs executed in the support device 12 and the terminal device 14 according to the present embodiment may be stored in a computer connected to a network such as the Internet, and made available for download over the network. The computer programs for executing the above-described processing in the support device 12 and the terminal device 14 according to the present embodiment may also be provided or distributed over a network such as the Internet.

The computer programs for executing the above-described various processing executed in the support device 12 and the terminal device 14 according to the present embodiment can generate the units described above on the main memory.

The various information stored in the HDD 92 may also be stored in an external device. In such a case, the external device is connected to the CPU 86 over a network or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fail within the scope and spirit of the inventions.

What is claimed is:

1. A communication support device comprising:
   a memory; and
   a processor electrically coupled to the memory, and configured to:
   acquire a message to be output to a user;
   create type information indicating a type of content of the message;
   analyze the message to allocate an importance level to the message based at least in part on analysis information comprising a user attribute;
   output the message in an output mode based on the importance level of the message among a plurality of output modes including at least a first output mode for outputting an entire message, a second output mode for outputting the type information, and a third output mode for outputting reception information indicating reception of the message;
   acquire detection information that includes at least one of an illuminance level of an environment where the user is located, a temperature of the environment, or a humidity of the environment;
   estimate state information indicating a current state of the user based at least in part on the detection information, the current state set to a first state or a second state; and
   determine the output mode based on the importance level of the message and the state information,
   wherein, when the illuminance level is higher than a threshold level, the temperature is within a temperature range, or the humidity is within a humidity range, the current state is set to the first state, and
   wherein, when the illuminance level is lower than a threshold level, the temperature is outside of the temperature range, or the humidity is outside of the humidity range, the current state is set to the second state.

2. The device according to claim 1, wherein the processor is configured to:
   determine the importance level of the message, wherein the output mode is determined, based on the importance level of the message and the state information, among the plurality of output modes including at least the first output mode, the second output mode, and the third output mode; and
   perform control to output the message in the determined output mode.

3. The device according to claim 2, wherein the processor is further configured to:
   receive a change instruction to change the determined output mode, wherein
   upon receiving the change instruction, the control is performed to output the message in an output mode other than the output mode used in previous output control.

4. The device according to claim 2, wherein the processor is configured to determine the importance level of the message based on the message and the type information.

5. The device according to claim 2, wherein the processor is configured to determine the importance level based on at least one of the message, the type information, an attribute of the user to be notified of the message, and an attribute of a user of a transmission source of the message.

6. The device according to claim 2, wherein the processor is configured to determine, for each user to be notified of the message, the output mode based on the importance level.

7. The device according to claim 1, wherein the processor is further configured to change the importance level according to an elapsed time from acquisition of the message.

8. The device according to claim 1, wherein the processor is further configured to change the importance level to a higher level when the message contains date-and-time information, date and time indicated by the date-and-time information is earlier than current date and time, and a difference between the current date and time and the date and time indicated by the date-and-time information is equal to or smaller than a first threshold.

9. The device according to claim 1, wherein the processor is further configured to change the importance level to a lower level when the message contains date-and-time information, date and time indicated by the date-and-time information is later than current date and time, and a difference between the current date and time and the date and time indicated by the date-and-time information is equal to or larger than a second threshold.

10. The device according to claim 1, wherein the message is voice data or video data.

11. The device according to claim 1, wherein the processor is configured to output the message, the type information, or the reception information.

12. A communication support method comprising:
   acquiring a message to be output to a user;
   creating type information indicating a type of content of the message;
   analyzing the message to allocate an importance level to the message based at least in part on analysis information comprising a user attribute;
   outputting the message in an output mode based on the importance level of the message among a plurality of output modes including at least a first output mode for outputting an entire message, a second output mode for outputting the type information, and a third output mode for outputting reception information indicating reception of the message;
   acquiring detection information that includes at least one of an illuminance level of an environment where the user is located, a temperature of the environment, or a humidity of the environment;
   estimating state information indicating a current state of the user based at least in part on the detection information, the current state set to a first state or a second state; and determining the output mode based on the importance level of the message and the state information, wherein, when the illuminance level is higher than a threshold level, the temperature is within a temperature range, or the humidity is within a humidity range, the current state is set to the first state, and wherein, when the illuminance level is lower than a threshold level, the temperature is outside of the temperature range, or the humidity is outside of the humidity range, the current state is set to the second state.

13. A computer program product comprising a non-transitory computer-readable medium including a computer program causing a computer to execute:

acquiring a message to be output to a user;

creating type information indicating a type of content of the message;

analyzing the message to allocate an importance level to the message based at least in part on analysis information comprising a user attribute;

outputting the message in an output mode based on the importance level of the message among a plurality of output modes including at least a first output mode for outputting an entire message, a second output mode for outputting the type information, and a third output mode for outputting reception information indicating reception of the message;

acquiring detection information that includes at least one of, an illuminance level of an environment, a temperature of the environment, or a humidity of the environment;

estimating state information indicating a current state of the user based at least in part on the detection information, the current state set to a first state or a second state; and determining the output mode based on the importance level of the message and the state information, wherein, when the illuminance level is higher than a threshold level, the temperature is within a temperature range, or the humidity is within a humidity range, the current state is set to the first state, and wherein, when the illuminance level is lower than a threshold level, the temperature is outside of the temperature range, or the humidity is outside of the humidity range, the current state is set to the second state.

* * * * *